D. KLEIN & D. BROWN.
TEAT CUP.
APPLICATION FILED SEPT. 22, 1909.
975,047.
Patented Nov. 8, 1910.
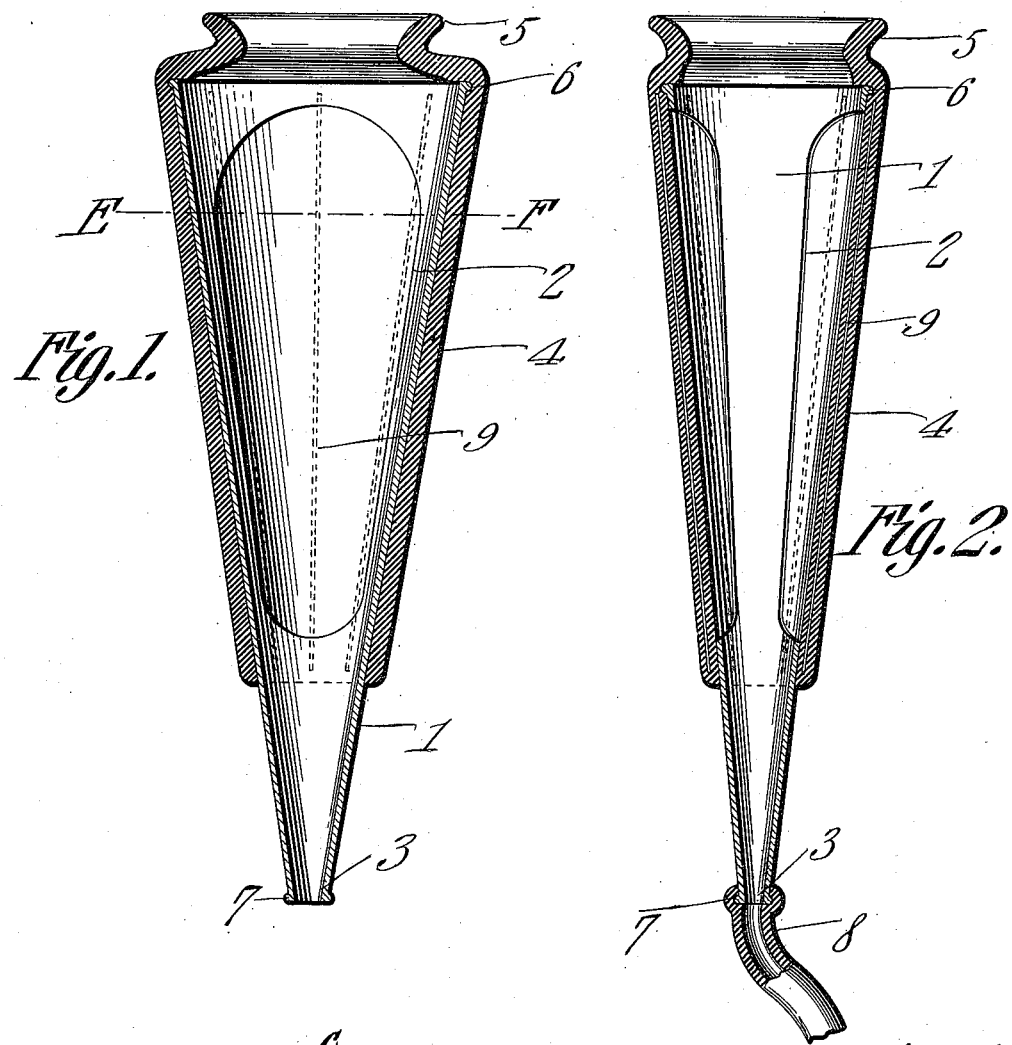
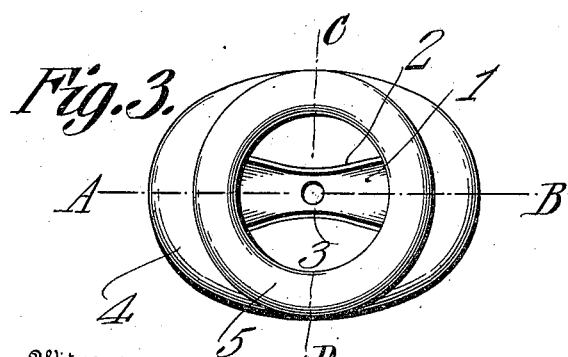
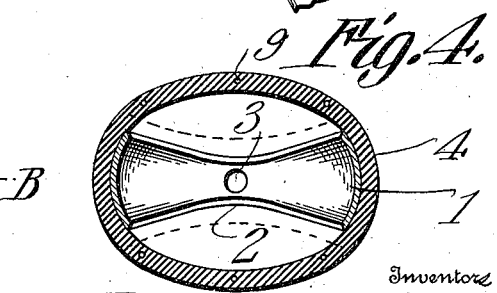

UNITED STATES PATENT OFFICE.

DANIEL KLEIN AND DAVID BROWN, OF SPOKANE, WASHINGTON.

TEAT-CUP.

975,047. Specification of Letters Patent. Patented Nov. 8, 1910.

Application filed September 22, 1909. Serial No. 518,934.

*To all whom it may concern:*

Be it known that we, DANIEL KLEIN and DAVID BROWN, citizens of the United States, residing at Spokane, in the county of Spokane, State of Washington, have invented a new and useful Teat-Cup, of which the following is a specification.

This invention has reference to improvements in teat cups designed for use in connection with milking machines of the pulsator type and its object is to produce a teat cup which in shape and operation will simulate closely a calf's mouth during the act of suckling. For this purpose there is provided a rigid casing tapering from one end toward the other and in cross section wider in one direction than the other while the portion of the walls which are the closer together and which may therefore be called the side walls of the casing are cut away and these cut away portions are covered by a flexible envelop surrounding the entire casing and projecting from the larger end thereof, the said projecting end being adapted to receive the teat of the cow and embrace the root end thereof while the flexible casing will press on opposite sides against the teat in a manner to simulate the action of the calf's mouth during the time in the operation of the pulsator when a partial vacuum is produced. Furthermore provision is made for retaining the elasticity of the walls of the envelop where they coincide with the cut away portions of the casing even when the natural resiliency of the material from which the envelop is made has been lost because of the age of the material. These several features of the invention as well as other features of the invention will be better understood from a consideration of the following detail description taken in connection with the accompanying drawings forming a part of this specification, in which drawings, Figure 1 is a longitudinal section on the line A—B of Fig. 3. Fig. 2 is a longitudinal section of the line C—D of Fig. 3. Fig. 3 is a top plan view of the teat cup. Fig. 4 is a cross section on the line E—F of Fig. 1.

Referring to the drawings there is shown a casing 1 which may be made of enameled or tinned metal or other thin rigid material and this casing is preferably of conical form, though this particular shape may be modified to some extent. Instead of being a true cone the body portion is flattened so that it is wider in one direction than the other and the wider walls or sides are cut away to form openings 2 tapering from the wide end of the casing toward the narrow end thereof.

Beyond the narrow ends of the openings 2 the casing tapers to a neck 3. Surrounding the casing 1 is an envelop 4, preferably of elastic rubber and extending from a point closer to the end 3 of the casing than is the narrow end of the opening 2, to and beyond the wide end of the casing where the envelop is narrowed so as to extend for a distance over the wide end of the casing or body of the teat cup and is there formed into a roll 5 of a suitable shape to form a passage for the entrance of the teat into the casing 1 and to embrace the root of the teat adjacent to the udder. The envelop 4 therefore completely covers the openings 2 through opposite sides of the casing. The wider end of the casing 1 may be provided with a bead 6 for anchoring the envelop 4 at this end and the end 3 of the casing may be provided with a bead 7 so that this end of the casing will receive and retain one end of a tube 8 leading to the pulsator in the usual manner.

It will be observed that the openings 2 are wide toward the teat receiving end of the teat cup and narrow toward the other end, and the envelop 4 will therefore yield more readily at the wide end than at the narrow end to air pressure due to the formation of a partial vacuum within the teat cup, the rigid casing 1 resisting such pressure. The inward movement of the flexible walls of the teat cup under the action of the partial vacuum is indicated in dotted lines in Fig. 4.

Rubber when new and elastic acts perfectly for the envelop 4, but in time rubber loses its elasticity and will no longer spring back to its original position. To overcome this defect there is introduced into the body of the rubber envelop a number of wires or like strands 9, extending longitudinally of the envelop and disposed so as to be adjacent to the openings 2. Now if the rubber envelop should lose its elasticity from any cause, the elasticity of the strands 9, which may be made of light steel wire or other elastic metal, will cause the return of the rubber envelop after being forced into the body of the teat cup by air pressure, to its original position, the workable elasticity of the envelop being thus indefinitely preserved.

The teat cup constructed in the manner described, or in substantially the manner described, is collapsible under the action of the pulsator in close similitude to the action of a calf's mouth when suckling and furthermore may be very cheaply constructed and has high efficiency, besides being very easily cleaned and therefore sanitary.

It will be observed that the cup is substantially oval in cross section and tapers from the teat receiving end toward the discharge end while the tapering openings on the wider sides of the cup body permit the collapsibility of the elastic envelop at these points, such elasticity being retained even though the natural elasticity of the material of the envelop should be lost. Moreover the end walls of the body of the cup are rigid and consequently the length of the oval is constant.

What is claimed is:

1. A teat cup having a one-piece body member for directly receiving and housing the teat and tapering from one end to the other and there formed to receive a milk conduit, said body member being substantially oval in cross section with the longer axis of the oval maintained constant and cut away on the sides traversed by the shorter axis, and an elastic envelop on the exterior of and embracing the said body member for a distance greater than the cut-away portion and extending beyond the wider end of said body member and there contracted to form a substantially circular seat for the root end of the teat.

2. A teat cup having a one piece body member for directly receiving and housing the teat and tapering from one end to the other and there formed to receive a milk conduit, said body member being substantially oval in cross section with the longer axis of the oval maintained constant and cut away on the sides traversed by the shorter axis, an elastic envelop on the exterior of and embracing the said body member for a distance greater than the cut-away portion and extending beyond the wider end of the body member and there contracted to form a substantially circular seat for the root end of the teat, and elastic strands in said envelop at the cut-away parts of the body member.

3. A teat cup having a one-piece body member for directly receiving and housing the teat and tapering gradually and constantly from one end to the other and there formed to receive a milk conduit, said body member being substantially oval in cross section with the longer axis of the oval maintained constant and cut away on the sides traversed by the shorter axis, and an elastic envelop on the exterior of and embracing the said body member for a distance greater than the cut-away portion and extending beyond the wider end of said body member and there contracted to form a substantially circular seat for the root end of the teat.

4. A teat cup having a one-piece body member for directly receiving and housing the teat and tapering gradually and constantly from one end to the other and there formed to receive a milk conduit, said body member being substantially oval in cross section with the longer axis of the oval maintained constant and cut away on the sides traversed by the shorter axis, an elastic envelop on the exterior of and embracing the said body member for a distance greater than the cut-away portion and extending beyond the wider end of said body member and there contracted to form a substantially circular seat for the root end of the teat, and elastic strands in said envelop in the cut-away parts of the body member.

5. A teat cup having a rigid metallic body portion cut away on opposite sides, and an envelop surrounding the body portion and covering the cut away parts, said envelop being elastic and collapsible at the cut away parts of the body portion and having elastic strands inserted in said envelop at the cut away parts of the body portion of the cup.

6. A teat cup having a rigid metallic body portion cut away at opposite sides, and an envelop surrounding the body portion and covering the cut away parts and there having longitudinally disposed elastic strands embedded therein.

7. A teat cup having a rigid metallic body portion cut away at opposite sides, and an envelop surrounding the body portion and covering the cut-away portions and there collapsible, said envelop extending beyond and free from the metallic body at the udder end and there contracted to embrace the root of the teat.

In testimony that we claim the foregoing as our own, we have hereto affixed our signatures in the presence of two witnesses.

DANIEL KLEIN.
DAVID BROWN.

Witnesses:
H. C. TYMAN,
A. C. WELD.